US012584330B2

(12) United States Patent
Hill et al.

(10) Patent No.: US 12,584,330 B2
(45) Date of Patent: *Mar. 24, 2026

(54) LATCH ASSEMBLY WITH REMOVABLE BATTERY

(71) Applicant: HONEYWELL INTERNATIONAL INC., Charlotte, NC (US)

(72) Inventors: Matthew Hill, Aumsville, OR (US); Anthony Pettigrew, Palm Beach Gardens, FL (US); Eric Chang, Palm Beach Gardens, FL (US); Christopher Marks, Palm Beach Gardens, FL (US); Patrick Sweeney, Palm Beach Gardens, FL (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 183 days.

This patent is subject to a terminal disclaimer.

(21) Appl. No.: 18/503,318

(22) Filed: Nov. 7, 2023

(65) Prior Publication Data

US 2024/0068275 A1 Feb. 29, 2024

Related U.S. Application Data

(63) Continuation of application No. 16/999,774, filed on Aug. 21, 2020, now Pat. No. 11,846,120.

(Continued)

(51) Int. Cl.

*E05B 47/06* (2006.01)
*E05B 47/00* (2006.01)
*E05B 65/00* (2006.01)

(52) U.S. Cl.

CPC ...... *E05B 47/0012* (2013.01); *E05B 65/0021* (2013.01); *E05B 2047/0018* (2013.01);

(Continued)

(58) Field of Classification Search

CPC .......................... Y10T 292/1028; Y10S 292/36
See application file for complete search history.

(56) References Cited

U.S. PATENT DOCUMENTS 2,045,186 A * 6/1936 Fritz .................. E05B 47/0607 70/279.1
3,933,382 A 1/1976 Counts et al.

(Continued)

FOREIGN PATENT DOCUMENTS

EP 0235041 B1 9/1987
WO WO-2019046654 A1 * 3/2019 ........... E05B 47/026
WO 2020206388 A1 10/2020

OTHER PUBLICATIONS

European Search Report for U.S. Appl. No. 23/202,840 dated Feb. 16, 2024.

*Primary Examiner* — Carlos Lugo
(74) *Attorney, Agent, or Firm* — Seager, Tufte & Wickhem, LLP

(57) ABSTRACT

A vertical door latch assembly includes a housing and a bolt movably attached to the housing having a catch portion. A drive motor is located within the housing and is configured to selectively move a lock assembly between a locked position preventing movement of the bolt and an unlocked position allowing movement of the bolt. A battery assembly is removable from the housing when the lock assembly is in first position and fixed to the housing when the lock assembly is in a second position. A controller is in electrical communication with the drive motor and is configured to direct the actuator lock assembly between the locked position and the unlocked position.

18 Claims, 9 Drawing Sheets

Related U.S. Application Data

(60) Provisional application No. 62/890,233, filed on Aug. 22, 2019.

(52) U.S. Cl.
CPC ................. *E05B 2047/0054* (2013.01); *E05B 2047/0067* (2013.01); *E05B 2047/0069* (2013.01); *E05B 2047/0072* (2013.01); *E05Y 2201/434* (2013.01); *E05Y 2201/474* (2013.01); *E05Y 2201/70* (2013.01); *E05Y 2201/702* (2013.01); *E05Y 2400/612* (2013.01); *E05Y 2400/66* (2013.01); *E05Y 2400/85* (2013.01); *E05Y 2600/46* (2013.01); *E05Y 2900/106* (2013.01)

(56) References Cited

U.S. PATENT DOCUMENTS

| | | | | |
|---|---|---|---|---|
| 5,878,612 | A * | 3/1999 | Mauer | E05B 47/0002<br>70/277 |
| 6,644,072 | B1 * | 11/2003 | Hsieh | E05B 47/0002<br>70/279.1 |
| 6,845,641 | B2 * | 1/2005 | Hsieh | E05B 47/0012<br>70/257 |
| 7,350,383 | B1 * | 4/2008 | Kuo | E05B 63/20<br>70/279.1 |
| 10,246,904 | B1 * | 4/2019 | White | E05B 47/0001 |
| 11,846,120 | B2 * | 12/2023 | Hill | E05B 47/0657 |
| 11,920,378 | B2 * | 3/2024 | Barnett, III | E05B 47/0607 |

* cited by examiner

LATCH ASSEMBLY WITH REMOVABLE BATTERY

CROSS-REFERENCE TO RELATED APPLICATIONS

This application is a continuation of U.S. application Ser. No. 16/999,774, filed Aug. 21, 2020, which claims priority to U.S. Provisional Application No. 62/890,233, filed Aug. 22, 2019.

BACKGROUND

The present disclosure relates to locks for doors that open vertically, such as rollup doors or overhead doors. More specifically, the present disclosure relates to a lock and control system for selectively granting access through rollup or overhead doors.

Self-storage centers typically provide multiple individual storage areas, each of which is accessible through a lockable, vertically opening, rollup door. In existing installations, each customer is provided a traditional keyed lock or provides their own traditional keyed lock to control access to an assigned storage area.

SUMMARY

In one exemplary embodiment, a vertical door latch assembly includes a housing and a bolt movably attached to the housing having a catch portion. A drive motor is located within the housing and is configured to selectively move a lock assembly between a locked position preventing movement of the bolt and an unlocked position allowing movement of the bolt. A battery assembly is removable from the housing when the lock assembly is in first position and fixed to the housing when the lock assembly is in a second position. A controller is in electrical communication with the drive motor and is configured to direct the actuator lock assembly between the locked position and the unlocked position.

In a further embodiment of any of the above, the battery assembly includes a housing at least partially enclosing a battery.

In a further embodiment of any of the above, the battery assembly includes a flexible arm that extends from the battery housing to a distal end.

In a further embodiment of any of the above, the housing includes a slot configured to accept a tab portion the distal end of the flexible arm.

In a further embodiment of any of the above, the distal end includes a release portion configured to engage the lock assembly when the lock assembly is in the second position.

In a further embodiment of any of the above, the first position corresponds the lock assembly being in a first locked position.

In a further embodiment of any of the above, the second position corresponds to the lock assembly being in a second locked position.

In a further embodiment of any of the above, the lock assembly includes a pin that selectively engages a pin opening in the bolt.

In a further embodiment of any of the above, the lock assembly includes a sliding nut in engagement with a lead screw driven by the drive motor.

In a further embodiment of any of the above, the lock assembly includes a blocker plate moveable relative to the housing.

In a further embodiment of any of the above, the blocker plate slideably engages the lead screw.

In a further embodiment of any of the above, the lead screw includes a threaded surface in engagement with a threaded surface on the sliding nut.

In a further embodiment of any of the above, the sliding nut includes a first end that has a first lead screw opening. A second end has a second lead screw opening. The distal end includes a release portion configured to engage one of the first or second ends of the sliding nut.

In a further embodiment of any of the above, the assembly includes at least one bolt position sensor for determining when the bolt is in the locked or unlocked position.

In a further embodiment of any of the above, the assembly includes at least one batter assembly position sensor for determining when the battery assembly is installed in the housing.

In another exemplary embodiment, a method of accessing a battery in a door latch assembly includes driving a drive motor in a latch housing in a first direction to rotate a lead screw. A sliding nut is moved along the lead screw to engage a release portion on a battery housing to disengage a catch portion on the battery housing from the latch housing. The battery assembly is removed from housing.

In a further embodiment of any of the above, the release portion is located on a distal end of an arm extending from the battery housing.

In a further embodiment of any of the above, the catch portion is located on the distal end of the arm.

In a further embodiment of any of the above, the sliding nut engages a blocker plate for moving a bolt between a locked and an unlocked position.

In a further embodiment of any of the above, moving a sliding nut along the lead screw to engage the release portion includes deflecting the arm to remove a tab on the catch portion from a slit in the latch housing.

DETAILED DESCRIPTION

Figure 1:
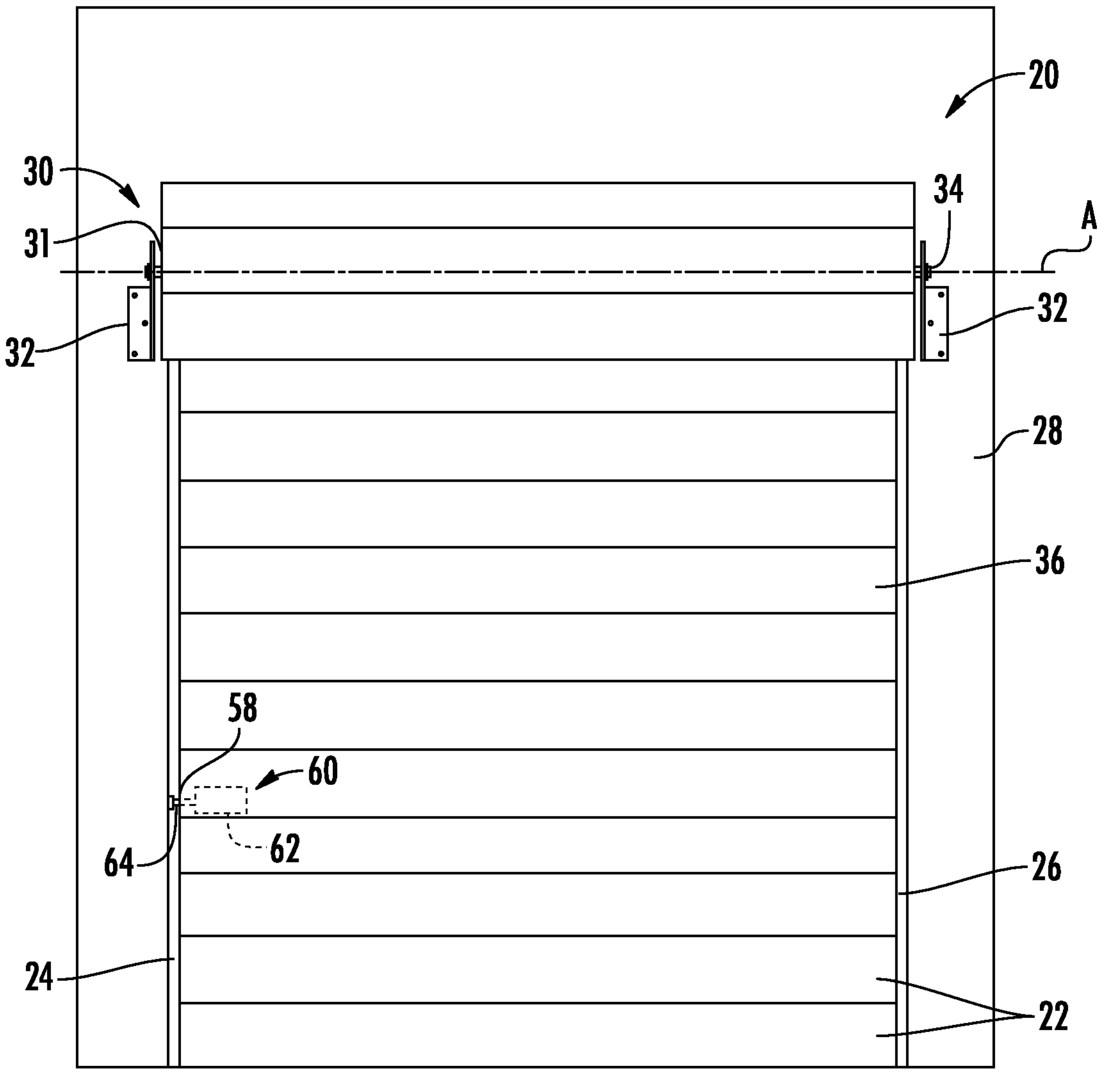
FIG. 1 illustrates an interior view of an example vertical door.
Figure 2:
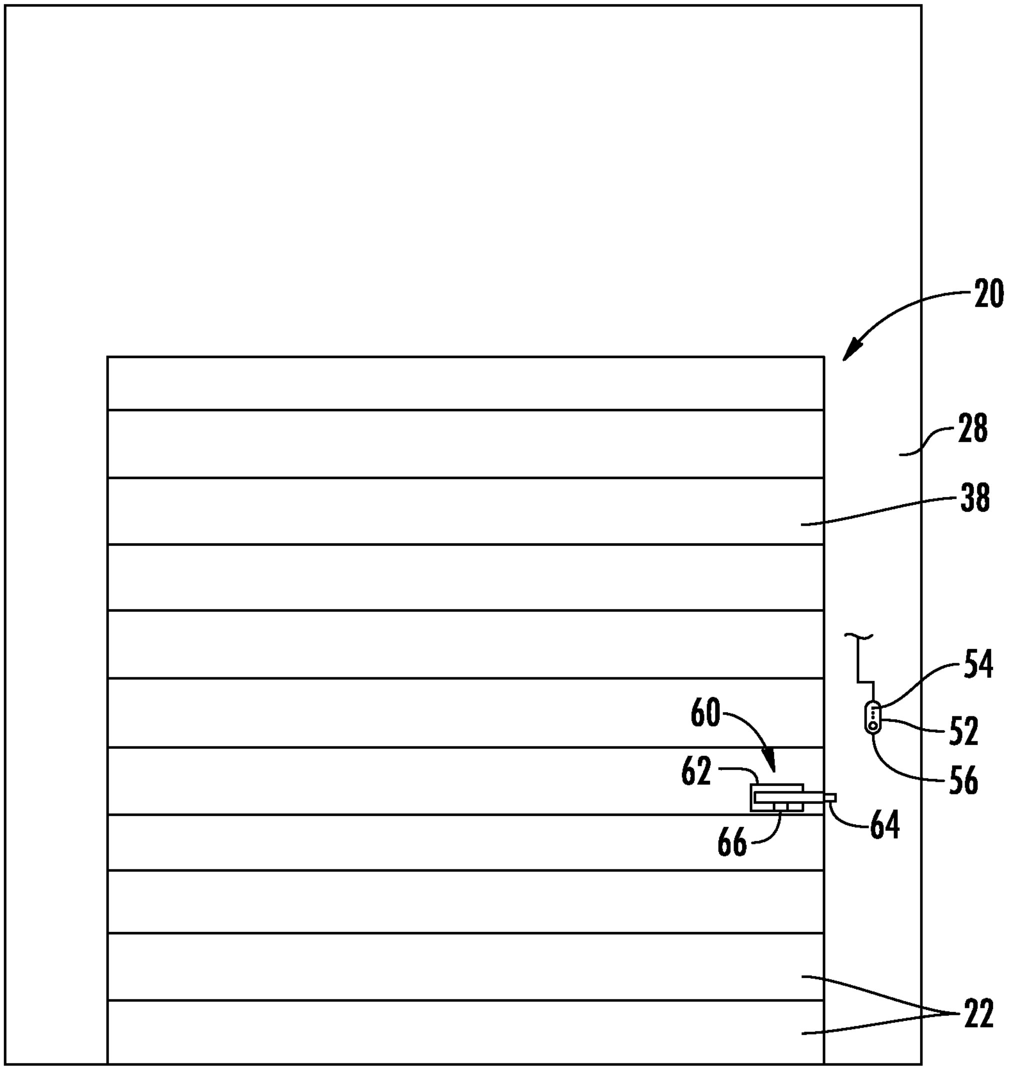
FIG. 2 illustrates an exterior view of the example vertical door of FIG. 1.

FIGS. 1 and 2 illustrate an example vertical door assembly 20, such as a rollup or overhead style door. The vertical door assembly 20 includes a plurality of slats 22 that are rotatably connected to each other along their length and slideably connected to a first vertical guide rail 24 and a second vertical guide rail 26 along respective opposite ends of the slats 22. In the illustrated example, the vertical door assembly 20 is used to selectively enclose an opening in a wall 28 and secure the opening in the wall through the use of a bolt assembly 60. The plurality of slats 22 include an interior surface 36 (FIG. 1) that faces towards an enclosed space and an exterior surface 38 (FIG. 2) that faces away from the enclosed space. The wall 28 could be a wall locating a building, a shipping container, a trailer, or any other type of arrangement where it is desirable to selectively enclose an opening in a structure.

The vertical door assembly 20 includes a tension wheel assembly 30 having a drum 31 supported by an axle 34 to allow the plurality of slats 22 to move through the first and second guide rails 24, 26 and collapse into a closed position. The tension wheel assembly 30 allows the plurality of slats 22 to roll around the axle 34 about an axis of rotation A to store the plurality of slats 22 above the opening in the wall 28. Additionally, the tension wheel assembly 30 could be spring loaded to reduce the force needed to raise the plurality of slats 22. In the illustrated example, the axle 34 is supported relative to the wall 28 through a bracket 32 located adjacent opposite ends of the axle 34 and fixed relative to the wall 28.

Figure 3:
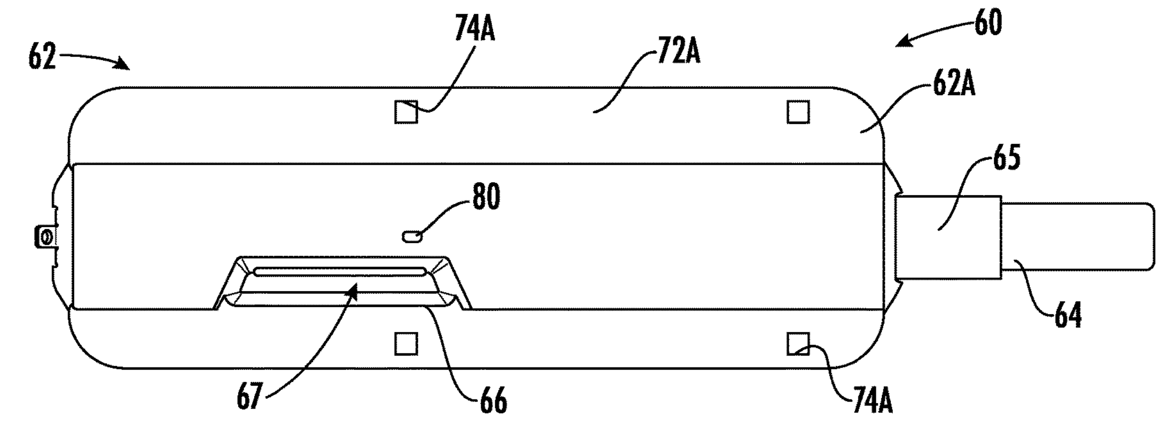
FIG. 3 is a front view of an example bolt assembly.
Figure 4:
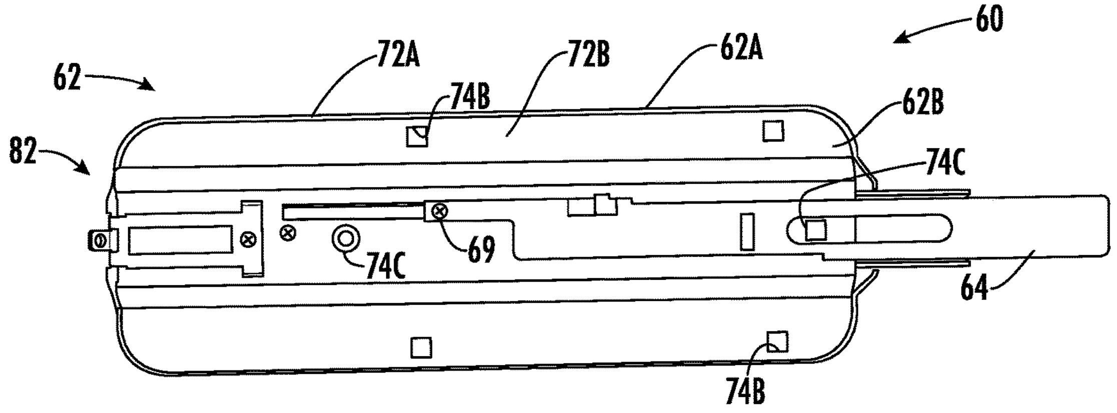
FIG. 4 is a rear view of the example bolt assembly of FIG. 3.
Figure 5:
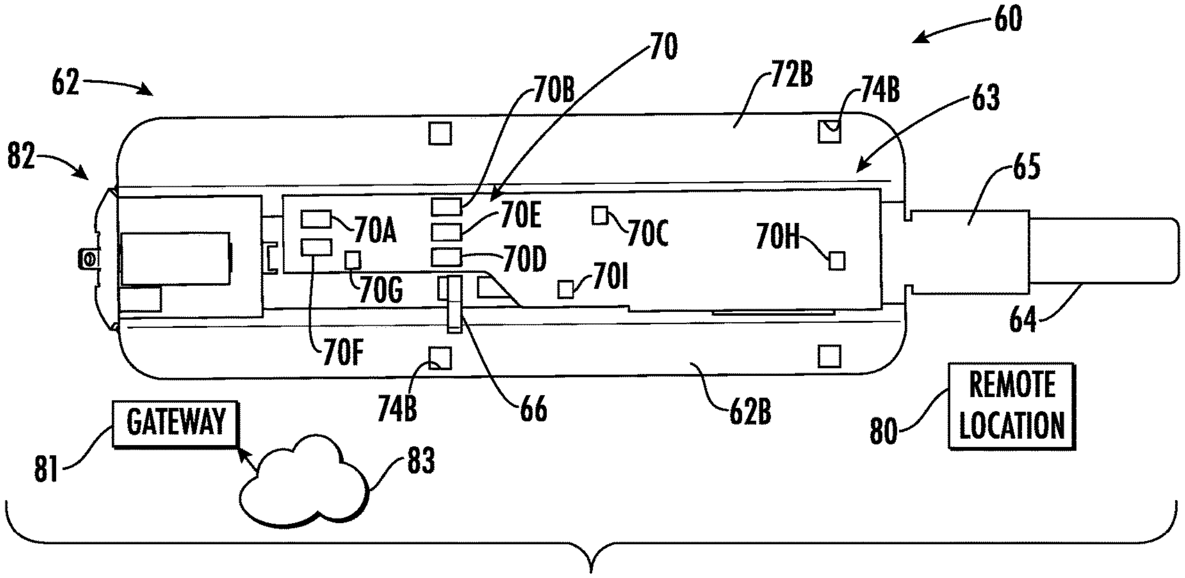
FIG. 5 illustrates the bolt assembly with a front portion removed.

FIGS. 3-5 illustrate an enlarged views of the example bolt assembly 60. In the illustrated example, the bolt assembly 60 includes a bolt housing 62 formed from a cover or first portion 62A and a back or second portion 62B that both at least partially define an interior cavity 63 (FIG. 5) within the bolt assembly 60. The back portion 62B includes a back surface that is at least partially in engagement with the exterior surface 38 one of the slats 22 as shown in FIG. 2. The front portion 62A also includes a front flange 72A that at least partially engages a back flange 72B on the back portion 62B. The front and back flanges 72A, 72B also completely surround the cavity 63 and each include corresponding fastener openings 74A, 74B that are used to secure the front and back portions 62A, 62B to each other and to one of the slats 22 (FIGS. 3-6).

The bolt assembly 60 also includes a bolt 64, which is slidable relative to the bolt housing 62 to allow the bolt 64 to engage an aperture 58 (FIG. 1) in the first vertical guide rail 24 to prevent the plurality of slats 22 from moving relative to the first and second vertical guide rails 24, 26. In the illustrated example, the bolt 64 includes a bolt handle 66 that allows a user to manually move a distal end or catch portion of the bolt 64 horizontally into and out of the aperture 58 in the first vertical guide rail 24. The handle 66 also extends from the bolt 64 in the cavity 63 through a handle aperture 67 defined the first portion 62A. The bolt 64 also extends through a bolt sleeve 65 on the back portion 62B. The sleeve 65 provides additional protection to the bolt 64 to prevent unwanted tampering with the bolt assembly 60.

Additionally, the handle 66 is attached to the bolt 64 through the use of a fastener 69 (FIG. 4), such as a screw. A strength of the fattener 69 is chosen to allow the handle 66 to separate from the bolt 64 if excessive force is applied to the bolt 64 that would indicate that the bolt assembly 60 is being forced open. Furthermore, if the handle 66 is separated from the bolt 64, the bolt assembly 60 can be serviced to allow the new handle 66 to be attached to the old bolt 64 with a new fastener 69 or to allow the bolt 64 and handle 66 to be replaced entirely.

Furthermore, this disclosure also applies to the bolt assembly 60 being located adjacent the second vertical guide rail 26. The aperture 58 could be located separate from one of the first or second vertical guide rails 24, 26 and be located in the wall 28 or another structure that is fixed relative to the wall 28.

As shown in FIG. 5, the bolt assembly 60 includes an electronic control module 70 in electrical communication with an actuator lock assembly 68 (FIG. 12) to selectively secure the bolt 64 when in a locking position or release the bolt 64 when in a non-locking position as will be described further below. In the illustrated example, the electronic control module 70 includes a printed circuit board in communication with memory 70A, a processor 70B, a wireless communications device 70C, and at least one indicator light 70D. The memory 70A is preprogrammed and in communication with the processor 70B, such as a controller, to perform the operations described below.

In one example, the wireless communications device 70C is capable of forming a Wi-Fi or Bluetooth connection to transfer a desired locked or unlocked request from a user wirelessly to the wireless communications device 70C to change an operating state of the actuator lock assembly 68. The electronic control module 70 may also utilize the at least one indicator light 70D to display a connection status with the user formed with the wireless communications device 70C and/or a locked status of the bolt 64 relative to the bolt housing 62. The electronic control module 70 is in electrical communication with a battery assembly 82 to provide power to the electronic control module 70.

The electronic control module 70 also monitors a position of the bolt 64, battery assembly 82 and, and vertical door assembly 20. To monitor a position of the bolt 64, the electronic control module 70 includes a first bolt sensor 70F and a second bolt sensor 70E. When the sensor 70F is active, the bolt 64 is in the locked position and when the sensor 70E is active, the bolt 64 is in the unlocked position. Alternatively, only one of the first and second bolt sensors 70F, 70E are used to confirm that the bolt 64 is locked or in another position. The electronic control module 70 can utilize the wireless communications device 70C to transmit to a remote location the status of the bolt 64. This allows a user at a remote location to be notified if a bolt assembly 60 is unlocked for a greater than expected time indicating that the vertical door assembly 20 may not be secured or that the vertical door assembly 20 may no longer be in use by an occupant of storage space. The electronic control module 70 is also includes a sensor 70I, such as an accelerometer, that can determine when the vertical door assembly 20 is in an open or closed position and communicate this information to a user as the remote location 80 if the vertical door assembly 20 is in an open location beyond a predetermined length of time.

Regarding the battery assembly 82, the first battery sensor 70G is active when the battery assembly 82 is removed from the housing 62 and the second battery sensor 70H is active when the battery assembly is locked. This information can also be communicated to the remote location 80 through the wireless communications device 70C. Information regarding the position of the battery assembly, opening of the vertical door assembly, and position of the bolt 64 can be logged by the remote location to maintain a history of activity at the vertical door assembly and with the bolt assembly 60. In addition, information regarding a lever of battery charge can be transmitted to the remote location to determine when the battery assembly 82 needs to be charged or replaced.

Figure 6:
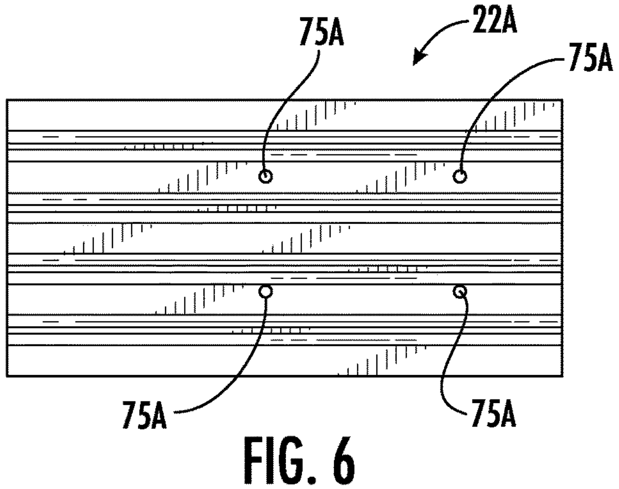
FIG. 6 illustrates an example set of slats for the example vertical door.
Figure 8:
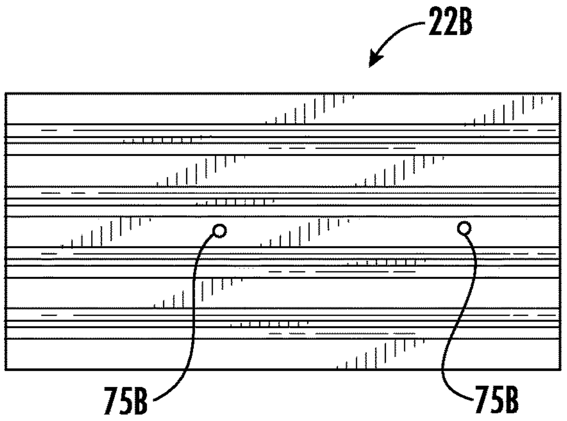
FIG. 8 illustrates another example set of slats for the example vertical door.
Figure 7:
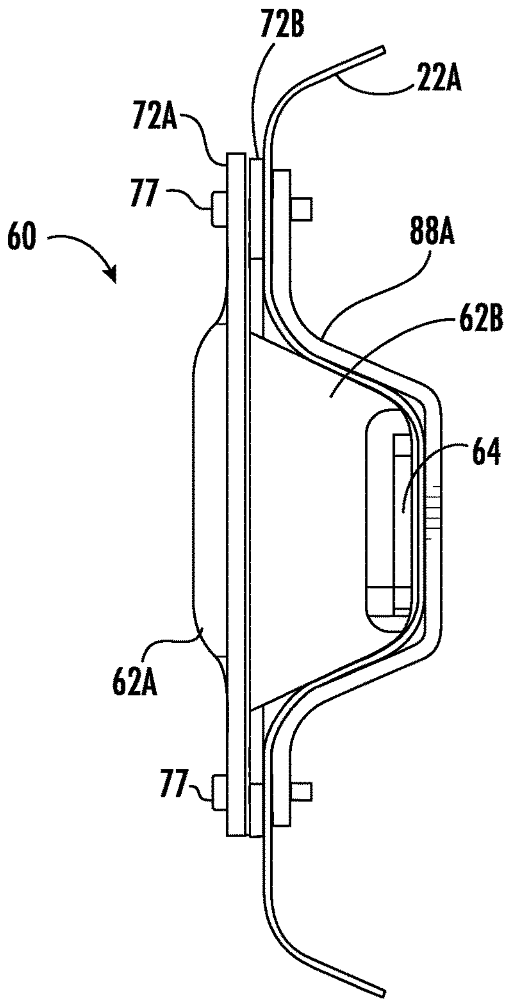
FIG. 7 illustrates a side view of the example bolt assembly on the example set of slats of FIG. 6.
Figure 9:
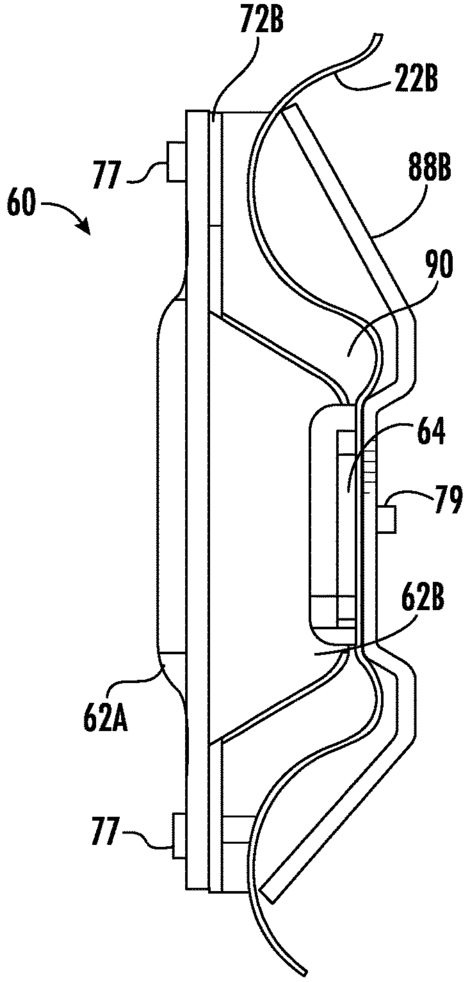
FIG. 9 illustrates a side view of the example bolt assembly on the example set of slats of FIG. 8.
Figure 10:
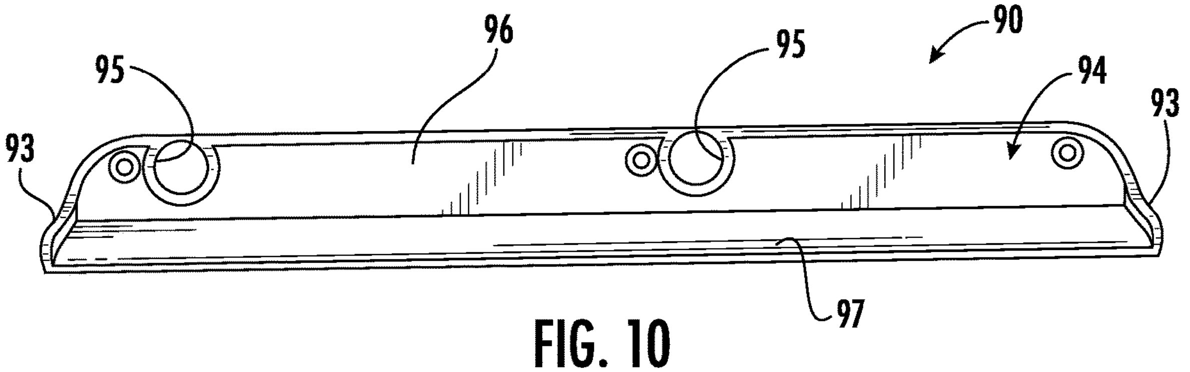
FIG. 10 is a front view of an example door spacer.
Figure 11:
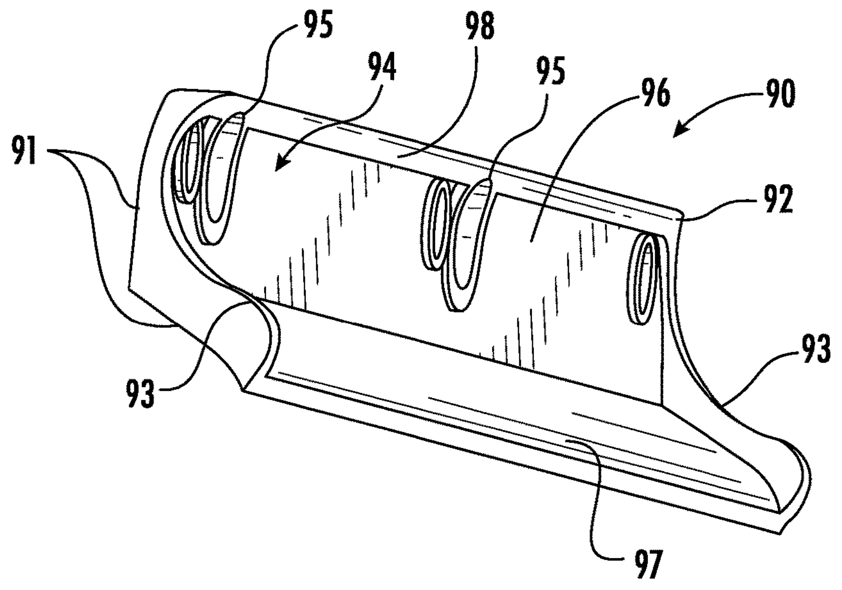
FIG. 11 is a perspective view of the example door spacer of FIG. 10.

FIGS. 6 and 7 illustrate the bolt assembly 60 attached to a plurality of slats 22A. In the illustrated example, the plurality of slats 22A include four fastener openings 75A that correspond to the fastener openings 74A, 74B in the bolt assembly 60. When the back portion 62B is located within a recessed portion of the slats 22, an upper and lower portion of the back flange 72B sits flush against and in directed contact with the portion of the slats 22A having the fastener openings 75A. Fasteners 77 can then secure the bolt assembly 60 to the slats 22A and extend through a backer plate 88A in contact with an interior surface 36A of the slats 22A. One feature of the backer plate 88A is to provide an engagement surface for the fasteners 77 that distributes the load of the fasteners 77 over a larger area of the slats 22 to prevent the fasteners 77 from pulling through the slats 22A and separating the bolt assembly 60 from the vertical door assembly 20.

Alternatively, as shown in FIGS. 8-11, when the bolt assembly 60 is used with a plurality of slats 22B having a two-hole configuration with a pair of spacers 90 to position the bolt assembly 60 relative to the slats 22B. The spacers 90 includes a bolt assembly contact side 91 and a slat contact side 92 opposite the bolt assembly contact side 91. The bolt assembly contact side 91 of the spacer 90 includes a surface that contacts both a portion of back flange 72B and a central region of the back portion 62B that fits within a recessed area of the slats 22B. The slat contact side 92 includes a surface that contacts the slat 22B and an end wall 93 at each opposing end of a first wall 96 and a second wall 97. The end walls 93 and the first and second walls 96, 97 form a cavity 94 with the slats 22B. The first wall 96 includes a lip 98 along an outer edge that extends between the end walls 93 that directly contacts the slats 22B. The spacer 90 also includes fastener openings 95 that accept fasteners 77 extending through fastener openings 74A, 74B in the bolt assembly 60. Therefore, the fasteners 77 secure the bolt assembly 60 to the spacers 90 and not the slats 22B.

Fasteners 79 secure the bolt assembly 60 to the slats 22B by extending through fastener openings 74C (FIG. 4) in the back portion 62B of the bolt assembly 60 into a backer plate 88B in contact with an interior surface 36B of the slats 22B. One feature of the backer plate 88B is to provide an engagement surface for the fasteners 79 that distributes the load of the fasteners 79 over a larger area of the slats 22B to prevent the fasteners 79 from pulling through the slats 22B and separating the bolt assembly 60 from the vertical door assembly 20.

FIGS. 12-15 illustrate a method of locking and unlocking the bolt 64 with the actuator lock assembly 68. In the illustrated example, the actuator lock assembly 68 includes a lead screw 102 driven by the drive motor 100, a blocker plate 104 configured to selectively allow movement of a pin 106 into and out of locking engagement with the bolt 64, and a spring 108 engaging a slider nut 110 at a first end of the spring and the blocker plate 104 at a second end of the spring.

Figure 12:
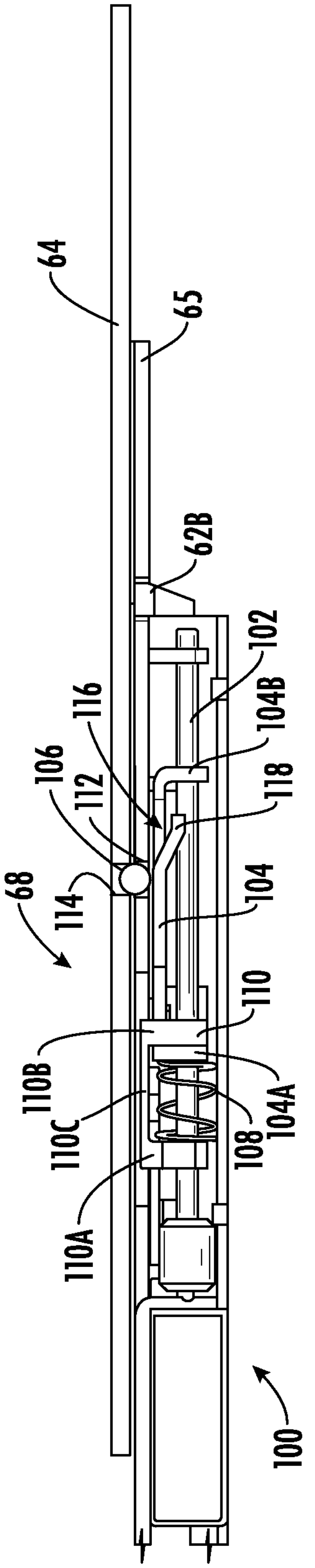
FIG. 12 illustrates the bolt assembly in a locked position.
Figure 13:
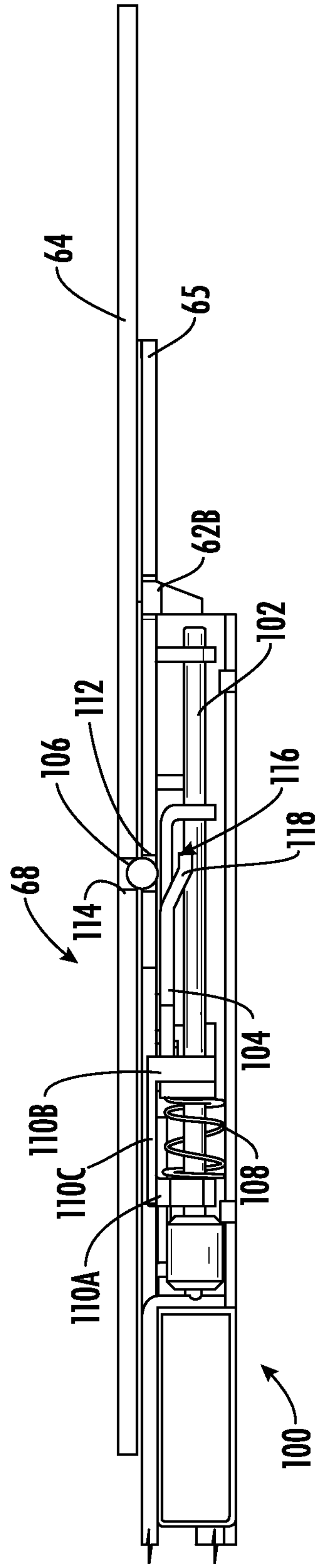
FIG. 13 illustrates the bolt assembly in a ready to unlock position.
Figure 14:
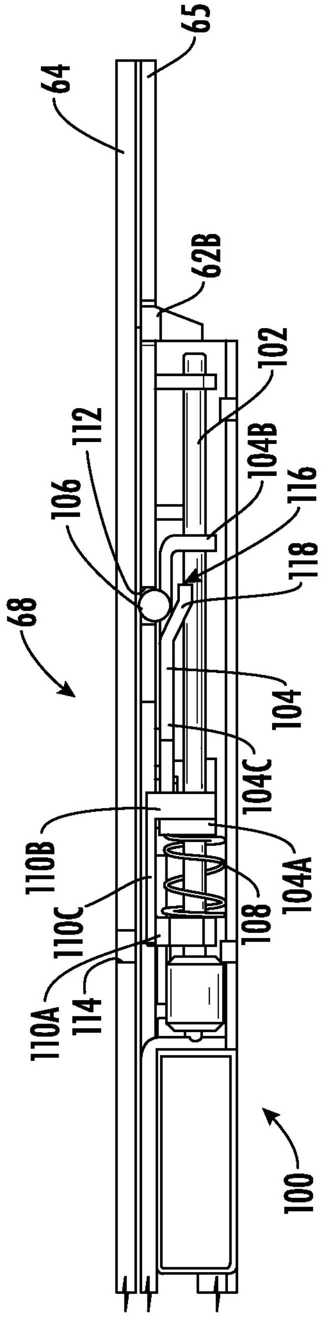
FIG. 14 illustrates the bolt assembly in a fully unlocked position.

As shown in FIG. 12, when the bolt 64 is in a locked position relative to the back portion 62B, the blocker plate 104 is positioned such that the pin 106 is located in a pin opening 112 in the back portion 62B and a pin opening 114 in the bolt 64.

To allow the bolt 64 to move relative to the back portion 62B, the motor 100 rotates the lead screw 102 in a first direction to draw the sliding nut 110 and the blocker plate 104 towards the motor 100. The lead screw 102 extends through both first and second ends 110A, 110B of the sliding nut 110 and first and second ends 104A, 104B of the blocker plate 104, respectively. Additionally, the second end 110B of the sliding nut 110 is in an overlapping relationship with the first end 104A of the blocker plate 104 along the lead screw 102 such that the second end 110B of the sliding nut 110 pulls the blocker plate 104 towards the motor 100 when the lead screw rotates in the first direction.

Furthermore, the first and second ends 104A, 104B of the blocker plate 104 slidably engages the lead screw 102 while at least one of the first or second ends 110A, 110B of the sliding nut threadably engage threads on the lead screw 102.

The blocker plate 104 includes a connecting portion 104C connecting the first and second ends 104A, 104B. The sliding nut 110 also includes a connecting portion 110C that extends between the first and second ends 110A, 110B and engages the back portion 62B to prevent the sliding nut 110 from rotating relative to the back portion 62B. However, the sliding nut 110 could travel through a track in the back portion 62B or engage another structure to prevent it from rotating with the lead screw 102.

To release the bolt 64 relative to the back portion 62B, the pin 106 must align with a pin recess 116 in the connecting portion 104C of the blocker plate 104. In the illustrated example, the pin recess 116 is defined by the connecting portion 104C of the blocker plate 104 and an arm 118 extending from the blocker plate 104. The arm 118 creates sufficient space for the pin 106 to fit between the bolt 64 on a first side and the arm 118 on a second opposite side. The pin 106 is at least partially located in the pin opening 112 in the back portion 62B in both the locked or unlocked position. Furthermore, the configuration in the illustrated example allows the blocker plate 104 to be manufactured by stamping from a single piece of material.

To lock the bolt 64 relative to the back portion 62B while the bolt 64 is still in a retracted position, the motor 100 drives the lead screw 102 in a second or opposite direction to move the sliding nut 110 and the blocker plate 104 away from the motor 100. Because the bolt 64 is still in a reacted position in FIG. 14, the pin 106 prevents the blocker plate 104 from moving to a fully extending position by engaging the arm 118.

Figure 15:
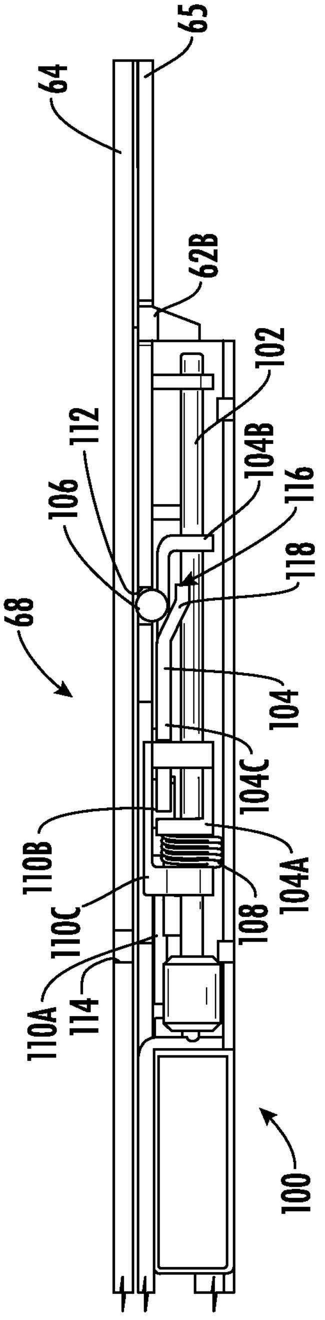
FIG. 15 illustrates the bolt assembly in a ready to lock position.
Figure 16:
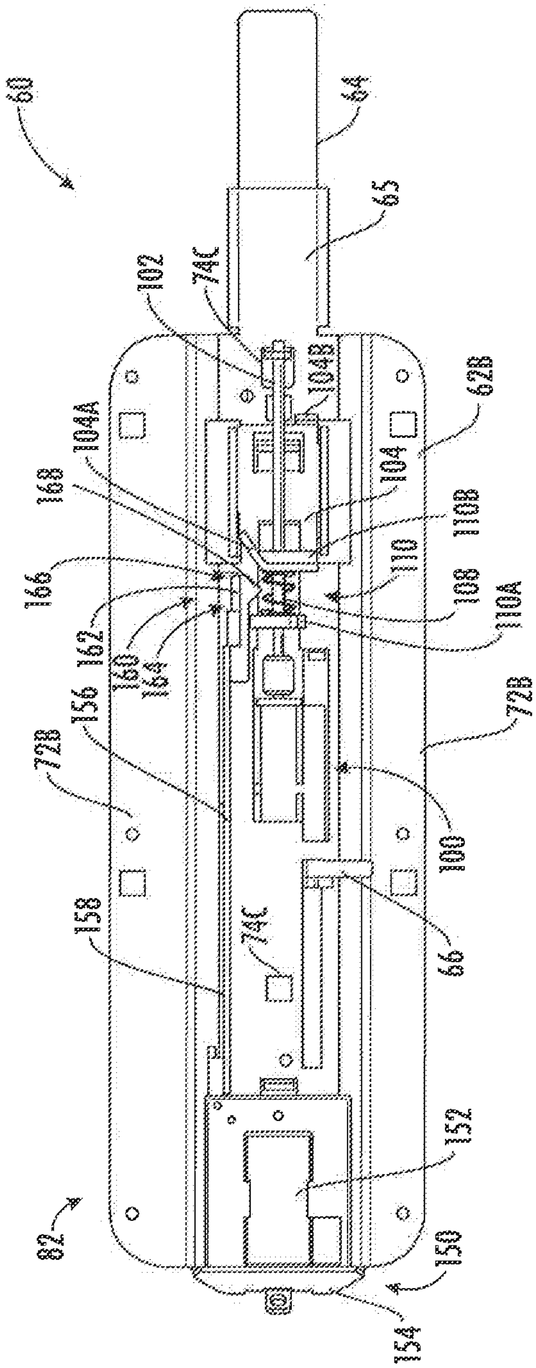
FIG. 16 illustrates a battery assembly in a locked position.
Figure 17:
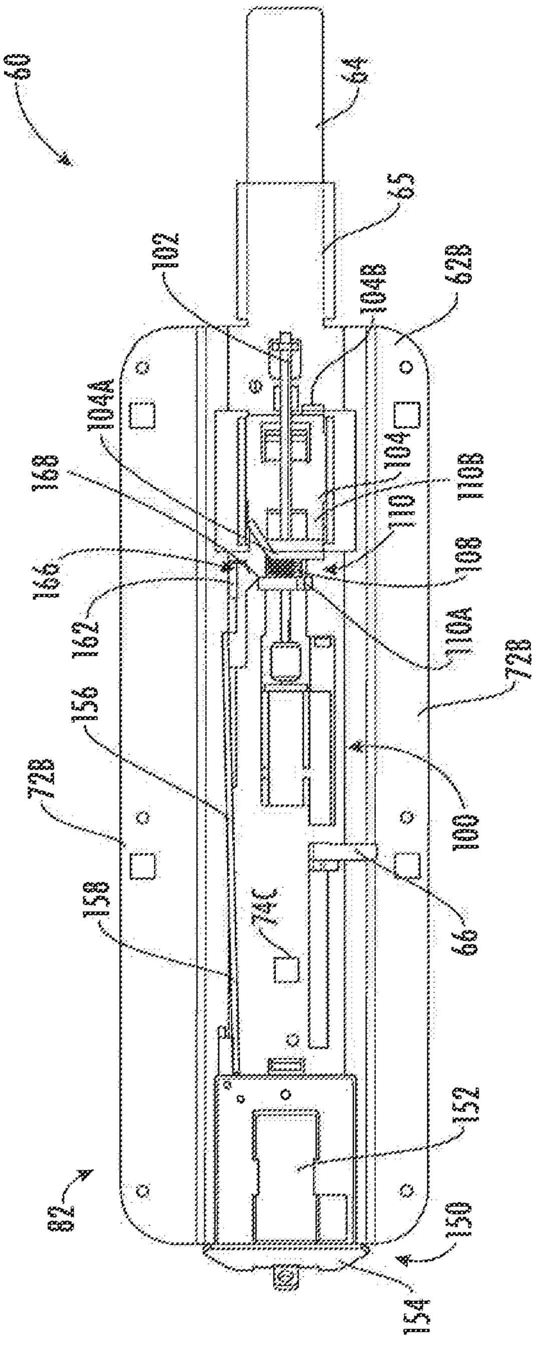
FIG. 17 illustrates the battery assembly of FIG. 16 in an unlocked position.

Because the sliding nut 110 and the blocker plate 104 are in an overlapping relationship with the spring 108, the sliding nut 110 compresses the spring 108 against the blocker plate 104. The compressed spring provides a biasing effect on the blocker plate 104 such that the blocker plate 104 will push the pin 106 back into the pin opening 114 in the bolt 64 when the bolt is moved to an extended position. As shown in FIG. 15, the spring loaded or biased position of the blocker plate 104 creates a gap or spacing between the second end 110B of the sliding nut 110 and the first end 104A of the blocker plate 104.

Once the bolt 64 is moved to an extended position, the pin 106 engages both the pin opening 114 in the bolt 64 and the pin opening 112 in the back portion 62B to lock the bolt 64 as shown in FIG. 12. The spring 108 also expands in axial length such that the second end 110B of the sliding nut 110 engages the first end 104A of the blocker plate 104. The control module 70 can selectively drive the motor 100 to varying positions as described above based on signals from a user or remote location 80 (FIG. 5).

During operation of the bolt assembly 60, a user communicates with the electronic control module 70 through the wireless communications device 70C to position the bolt assembly 60 in a locked or unlocked position. Additionally, the electronic control module 70 can move the bolt assembly into a locked position or a ready to be locked position after a predetermined length of time to prevent a user from inadvertently leaving the bolt assembly unlocked. The communication between the user and the wireless communications device 70C may occur through an application or web interface on a user's mobile device through a Bluetooth or other type of wireless connection.

Additionally, the electronic control module 70 can store a record of the user that accessed the wireless communications device 70C on the memory 70A on the electronic control module 70. The record can include the identity of the user based on the device used to access the wireless communications device 70C and the time of the request. Alternatively, the electronic control module 70 can send the record to a remote location 80 (FIG. 5) through use of the wireless communications device 70C to monitor access through the vertical door assembly 20. Additionally, the remote location 80 can send a signal to the electronic control module 70 through the wireless communications device 70C to direct the actuator lock assembly 68 to move between one of the locked or unlocked position.

Additionally, the wireless communications device 70C can form a wireless connection with a gateway 81 that communicates to the cloud 83 through another wireless connection. The wireless connection in communication with the cloud 83 might include a wireless communication method such as Wi-Fi, Long Range BRLE, LoRaWAN, sub-gig hz, SIG-FOX, or NBIOT. One feature of these wireless communication methods is the ability to transmit information over long distances which is helpful in areas with poor cellular service. Additionally, the wireless communication method might be a one-way communication or a two-way communication such that the wireless communications device 70C with receive messages or information from the wireless communication method.

The wireless communications device 70C could communicate information including who unlocked the bolt assembly 60, when and how long the bolt assembly 60 was left unlocked, if the bolt assembly 60 is still left unlocked such that this information could be stored in the cloud 83 to monitor operation of the bolt assembly 60. If any of the information obtained from the wireless communications device 70C is outside of predetermined parameters, a message could be sent through the cloud to a person responsible to manage access through the vertical door into the storage space.

FIGS. 16-19 illustrate a method of selectively removing the battery assembly 82 from the bolt assembly 60. In particular, the battery assembly 82 cannot be removed from the bolt assembly 60 without the electronic control module 70 communicating with the drive motor 100 to move a battery latch 156 between a latched and unlatched position.

In the illustrated example, the battery assembly 82 includes a battery housing 150 for securing a battery 152 within the housing 62. The battery housing 150 fits between opposing flanges 72A, 72B and includes an end plate 154 that forms a boundary of at least a portion of the cavity 63. The battery housing 150 is secured to the back portion 62B by the battery latch 156. The battery latch 156 includes a flexible arm 158 extending from the battery housing 150 at a proximal end to a distal end adjacent the lock assembly 68. In the illustrated example, the flexible arm 158 extends a majority of a length of the back portion 62B.

The distal end of the flexible arm 158 includes a catch portion 160 having a catch tab 162 that fits within a slot 164 in the back portion 62B. The battery latch 156 also includes a latch release portion 166 located adjacent the catch portion 160 on the distal end of the battery latch 156. The latch release portion 166 includes a release tab 168 that also extends form the distal end of the battery latch 156 to allow the catch tab 162 to be released from the slot 164. In the illustrated example, the catch tab 162 and the release tab 168 are positioned perpendicular from each other such that displacement of the release tab 168 moves the catch tab 162 out of the slot 164.

When the electronic control module 70 receives a message to release the battery assembly 82 from the housing 62, a signal is sent to the drive motor 100. The signal causes the drive motor 100 to rotate the lead screw 102 in the second direction to cause the sliding nut 110 to move away from the drive motor 100. As the lead screw 102 moves the sliding nut 110 in a direction away from the drive motor 100, the spring 108 is compressed between the first end 110A of the sliding nut 110 and the first end 104A of the blocker plate 104. The blocker plate 104 is stopped from moving in a direction further away from the drive motor 100 by engaging a portion of the back portion 62B or another stop. Additionally, because the blocker plate 104 is not threadably engaging the lead screw 102, the lead screw 102 is able to rotate freely relative to the blocker plate 110 while engaging threads on the sliding nut 110.

Figure 18:
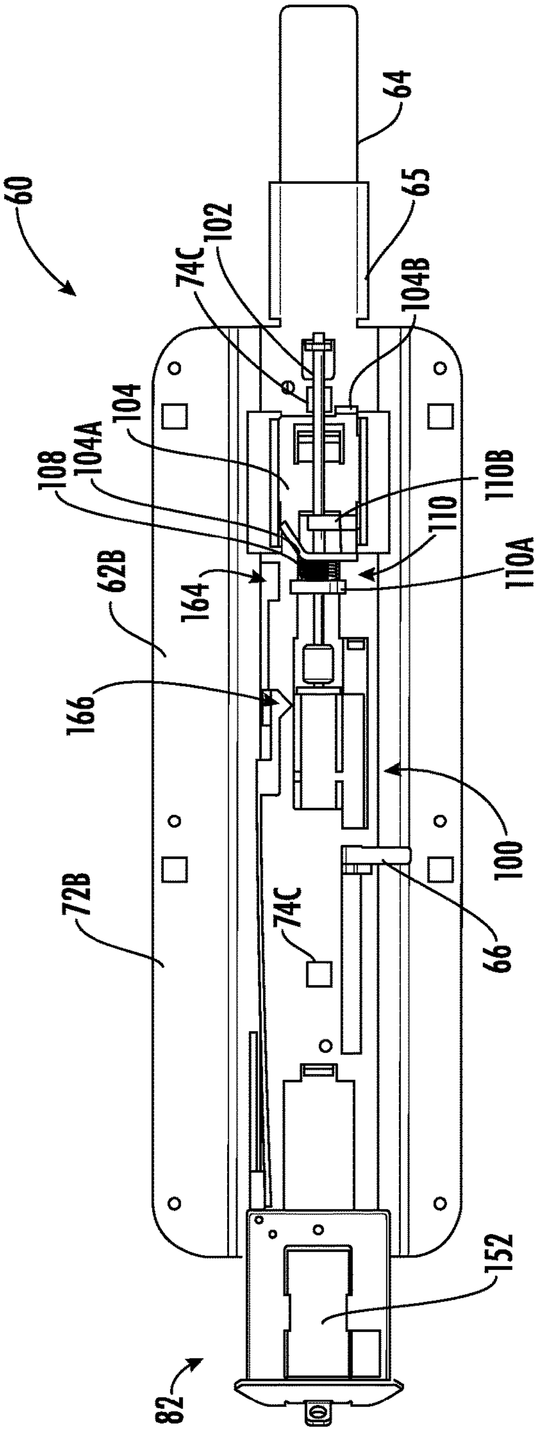
FIG. 18 illustrates the battery assembly of FIG. 16 being removed from the bolt assembly.

In the illustrated example, the release tab 168 extends into a space between the first and second ends 110A, 110B of the sliding nut 110. However, as the drive motor 100 rotates in the second direction and compresses the spring 108, the first end 110A of the sliding nut 110 moves toward the release tab 168 until the first end 110A of the sliding nut 110 is contact with the sliding nut 110 and has deflected the flexible arm 158 a sufficient amount to move the catch tab 162 out of the slot 164 In the illustrated example, the release tab 168 includes a triangular cross section with one side of the triangle that slides across the first end 110A of the sliding nut 110. The battery assembly 82 can then slide out of the housing 62, as shown in FIGS. 18, to allow the battery 152 to be charged or replaced.

Figure 19:
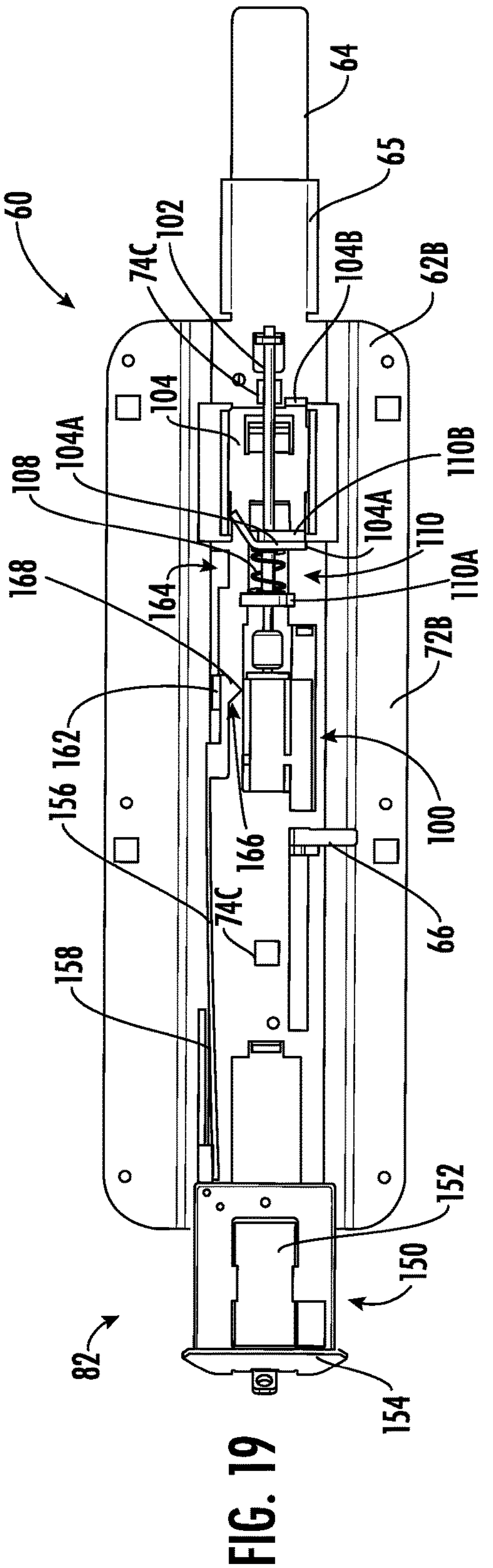
FIG. 19 illustrates the battery assembly of FIG. 16 being installed into the bolt assembly.

When the battery assembly 82 is ready to be reinstalled, as shown in FIG. 19, the electronic control module 70 sends a signal to the drive motor 100 to rotate the lead screw 102 in the first direction. The lead screw 102 is rotated until it draws the second end 110B of the sliding nut 110 to contact with the first end 104A of the blocker plate 104. The battery assembly can then be slide back into the housing 62 and secured with the catch tab 162 located between the first and second ends 110A, 110B of the sliding nut 110.

Although the different non-limiting examples are illustrated as having specific components, the examples of this disclosure are not limited to those particular combinations. It is possible to use some of the components or features from any of the non-limiting examples in combination with features or components from any of the other non-limiting examples.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A vertical door latch assembly comprising:
- a housing;
- a lock body movably attached to the housing and having an opening that receives at least a portion of a lock member when in a locked position, the lock body configured to move between a latched and unlatched position;
- a motor located within the housing
- a driver operably coupled to the motor and configured to selectively move the lock member along a first path between the locked position preventing movement of the lock body and an unlocked position allowing movement of the lock body;
- a battery assembly operably coupled to the driver, the battery assembly being removable from the housing when the lock member is in first position and fixed to the housing when the lock member is in a second position, wherein when the driver is moving the lock member by the motor, the driver disengages with the battery assembly to allow removal of the battery assembly; and
- a controller in electrical communication with the motor and configured to direct the lock member between the locked position and the unlocked position, and wherein, once the lock member moves out of the opening, the lock body is moveable along a second path that is non-parallel with the first path.

2. The vertical door latch assembly of claim 1, wherein the housing comprises a cover portion and a back portion that are secured together to provide an internal cavity that receives the lock member, lock body, and the battery assembly, and wherein the housing is mounted to a door surface comprised of a plurality of slats.

3. The vertical door latch assembly of claim 1, wherein the battery assembly includes a battery housing at least partially enclosing a battery and a flexible arm extending from the battery housing to a distal end.

4. The vertical door latch assembly of claim 3, wherein the battery housing includes a slot configured to accept a tab portion the distal end of the flexible arm.

5. The vertical door latch assembly of claim 4, wherein the distal end includes a release portion engageable with the lock member when the lock member is in the second position.

6. The vertical door latch assembly of claim 5, wherein the first position corresponds to the lock member being in a first locked position and the second position corresponds to the lock member being in a second locked position.

7. The vertical door latch assembly of claim 1, wherein the opening comprises at least one discrete opening that extends through a thickness of the lock body, and wherein the lock member comprises an arcuate member that selectively engages the at least one discrete opening in the lock body.

8. The vertical door latch assembly of claim 7, wherein the lock member includes a slider in engagement with a lead screw driven by the driver.

9. A vertical door latch assembly comprising:
- a housing;
- a lock member positioned within the housing and moveable along a first path between a lock position and an unlock position;
- a lock body having an opening that receives at least a portion of the lock member when in the lock position, the lock body configured to move between a latched position and an unlatched position;
- a slider having at least one abutment surface that engages the lock member when in the lock position;
- a motor;
- a driver operably coupled to the motor that rotates a drive member to move the slider along a linear path between at least
  - a first position wherein the at least one abutment surface engages the lock member and the portion of the lock member is received within the opening, and
  - a second position wherein the at least one abutment surface moves out of engagement with the lock member;
- wherein, once the portion of the lock member moves out of the opening, the lock body is moveable along a second path that is non-parallel with the first path;
- a controller in electrical communication with the motor and configured to direct the drive member between the first position and the second position; and
- a battery assembly providing power to the controller, wherein the battery assembly is operably coupled to the driver and is selectively removable from the housing when the lock member is in a first position and fixed to the housing when the lock member is in a second position, wherein when the driver is moving the lock member by the motor, the driver disengages with the battery assembly to allow removal of the battery assembly.

10. The vertical door latch assembly of claim 9, wherein the slider includes an outwardly extending arm that cooperates with the drive member to move the slider between at least the first position and the second position.

11. The vertical door latch assembly of claim 9, wherein the driver comprises a motor and the drive member comprises a spiraling member.

12. The vertical door latch assembly of claim 9, wherein the lock member comprises an arcuate member.

13. The vertical door latch assembly of claim 9, wherein the slider comprises a blocker plate that is slidable along the drive member and a slider nut that is threadably engaged with the drive member, and wherein the slider is located on an opposite side of a portion of the housing from the lock body.

14. The vertical door latch assembly of claim 9, wherein the slider includes a recess that receives the lock member when in the second position, and wherein the slider includes an arm portion that aligns with the lock member when in the unlock position.

15. The vertical door latch assembly of claim 9, wherein the housing comprises a cover portion and a back portion that are secured together to provide an internal cavity that receives the lock member, lock body, and the slider, and wherein the housing is configured to be mounted to a door surface.

16. The vertical door latch assembly of claim 15, wherein the lock body includes a catch portion configured to engage.

17. A method of operating a vertical door latch assembly comprising:

movably attaching a lock body to a latch housing, the lock body having an opening that receives at least a portion of a lock member when in a locked position;

locating a driver within the latch housing configured to selectively move the lock member long a first path between the locked position preventing movement of the lock body and an unlocked position allowing movement of the lock body; and controlling the driver to selectively direct the lock member between the locked position and the unlocked position, and wherein, once the lock member moves out of the opening, the lock body is moveable along a second path that is non-parallel with the first path;

driving the driver in a first direction to rotate a lead screw;

moving a slider along the lead screw to engage a release portion on a battery housing to disengage a catch portion on battery housing from the latch housing; and removing a battery assembly from housing.

18. The method of claim 17, wherein driving the driver includes selectively moving an arcuate member into and out of engagement with the opening in the lock body, wherein the opening comprises at least one discrete opening that extends through a thickness of the lock body.

* * * * *